(12) United States Patent
Emerson et al.

(10) Patent No.: US 8,877,279 B2
(45) Date of Patent: Nov. 4, 2014

(54) DOUGH ROLLING METHOD AND PRODUCT

(71) Applicant: Frito-Lay North America, Inc., Plano, TX (US)

(72) Inventors: David B. Emerson, Coppell, TX (US); Shalaka Narwankar, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 14/158,927

(22) Filed: Jan. 20, 2014

(65) Prior Publication Data
US 2014/0134314 A1    May 15, 2014

Related U.S. Application Data

(62) Division of application No. 13/666,650, filed on Nov. 1, 2012, now Pat. No. 8,668,485.

(51) Int. Cl.
| | | |
|---|---|---|
| *A21C 3/06* | (2006.01) | |
| *A21D 8/02* | (2006.01) | |
| *A21D 13/00* | (2006.01) | |
| *A21C 11/08* | (2006.01) | |

(52) U.S. Cl.
CPC ... *A21D 8/02* (2013.01); *A21C 3/06* (2013.01); *A21D 13/00* (2013.01); *A21C 11/08* (2013.01)
USPC .............. 426/549; 99/353; 426/501; 426/502

(58) Field of Classification Search
CPC ............. A21C 3/06; A21D 8/02; A21D 13/00

USPC .............................. 99/353; 426/501, 502, 549
See application file for complete search history.

(56) References Cited

U.S. PATENT DOCUMENTS

| | | | |
|---|---|---|---|
| 5,306,513 A | 4/1994 | Colucci et al. | |
| 6,001,409 A | 12/1999 | Gimmler et al. | |
| 7,156,642 B2 * | 1/2007 | Anderson et al. ............. | 425/297 |
| 2006/0062879 A1 | 3/2006 | Anderson et al. | |
| 2010/0230940 A1 | 9/2010 | Hellot et al. | |

FOREIGN PATENT DOCUMENTS

| | | | |
|---|---|---|---|
| EP | 2227968 | * | 9/2010 |
| JP | 2003-23952 | * | 1/2003 |

OTHER PUBLICATIONS

PCT ISR from PCT/US2013/068092 dated Mar. 11, 2014, 2 pages.

* cited by examiner

*Primary Examiner* — James Mackey
(74) *Attorney, Agent, or Firm* — Colin P. Cahoon; Celina M. Orr; Carstens & Cahoon, LLP

(57) ABSTRACT

An improved dough-rolling product and method for rolling sheeted dough. The proposed invention comprises a dough-rolling method having a dough sheeter that cuts a dough sheet into preforms having a concave leading edge and convex trailing edge. A rolling curtain creates a rolled preform with the leading edge on the inside and the trailing edge on the outside. The rolled preform is cooked to produce a rolled snack product with consistent thickness throughout its length and a round outer flap.

6 Claims, 2 Drawing Sheets

DOUGH ROLLING METHOD AND PRODUCT

CROSS-REFERENCE TO RELATED APPLICATIONS

This application is a divisional application of co-pending U.S. patent application Ser. No. 13/666,650, entitled "Dough Rolling Apparatus, Method and Product," filed Nov. 1, 2012, the technical disclosure of which is hereby incorporated by reference in its entirety.

BACKGROUND

1. Technical Field

The present invention relates to an apparatus and method for forming a rolled dough food product. Specifically, this invention relates to a dough-rolling apparatus having a dough sheeter that produces dough preforms with particular shape characteristics, which is rolled into rolled dough preforms.

2. Description of Related Art

Rolled products are found in many different food industries such as croissants, wafer sticks, and frozen/stuffed taquitos. Many prior art processes have been developed to address the complexities of rolling each of these products. For example, the croissant industry generally utilizes a relative speed differential between two belts. Croissants are made from relatively thick dough with a high degree of tackiness, which makes it fairly easy to manipulate. In contrast, the wafer stick industry typically uses a batter that is drum dried, wound around a mandrel at a 45-degree angle, and then cut into pieces.

In the snack food industry, however, the dough used typically comprises one or more starches and/or flour, which dough is then thinly sheeted, cut into pieces, and then toasted, fried and/or baked. Typical dough types include, but are not limited to, the following: potato-, rice-, corn-, and wheat-based doughs. The dough used in such snack products, unlike the dough used in other food industries, is generally very thin, fragile, and difficult to manipulate. This makes typical rolling technology unacceptable for such an application. Additionally, the processing rates required in the snack food industry are very high relative to other industries, making dough-rolling even more difficult. Consequently, a need exists for a dough-rolling apparatus and method that produces rolled snack products that are consistent in texture and flavor.

SUMMARY OF THE INVENTION

The proposed invention comprises a dough-rolling apparatus and method that produces rolled dough preforms and food products with a concave leading edge rolled inside the preform/product and a concave trailing edge forming a rounded outer flap on the outside of the rolled preform/product.

In one embodiment of the invention, an apparatus comprises a dough sheeter comprising a cutting pattern and orientation configured to cut a dough sheet into dough preforms having a concave leading edge and a convex trailing edge when said preforms are deposited on a sheeting conveyor; at least one rolling curtain draped upon the sheeting conveyor configured to roll said dough preforms into rolled dough preforms, wherein said concave leading edge is inside each said rolled dough preform and wherein said convex trailing edge is outside each said rolled dough preform, thereby forming a rounded outer flap on each said preform. In another embodiment, said cutting pattern comprises a first preform cutout with a concave leading edge which is congruent and contiguous with at least a portion of a convex trailing edge of a second preform cutout adjacent to said first preform cutout. In yet another embodiment, said cutting pattern comprises at least one circumferential row of preform cutouts, wherein each said preform cutout comprises a concave leading edge which is congruent and contiguous with at least a portion of an adjacent preform cutout.

In one embodiment of the invention a rolled snack food comprises a concave leading edge rolled inside said snack food and a convex trailing edge forming a rounded flap outside said snack food. In another embodiment, the rolled snack food comprises a total moisture content by weight of less than about 3%.

In one embodiment of the invention, a method of making a rolled snack food product comprises cutting a dough sheet into dough preforms, wherein each said preform comprises a concave side and a convex side; depositing said dough preforms onto a conveyor such that each said concave side is a leading edge and each said convex side is a trailing edge; rolling said dough preforms to produce rolled dough preforms, wherein each said concave leading edge is inside each said rolled dough preform and wherein each said convex trailing edge is outside each said rolled dough preform, thereby forming a rounded outer flap on said preform; and cooking said preform to produce said rolled snack food product comprising less than 3% moisture by weight. In another embodiment, the method comprises toasting said preforms after said rolling step and before said cooking step.

Additional features and benefits of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

While the invention is described below with respect to a preferred embodiment, other embodiments are possible. The concepts disclosed herein apply to other systems for producing sheeted products.

Figure 1:
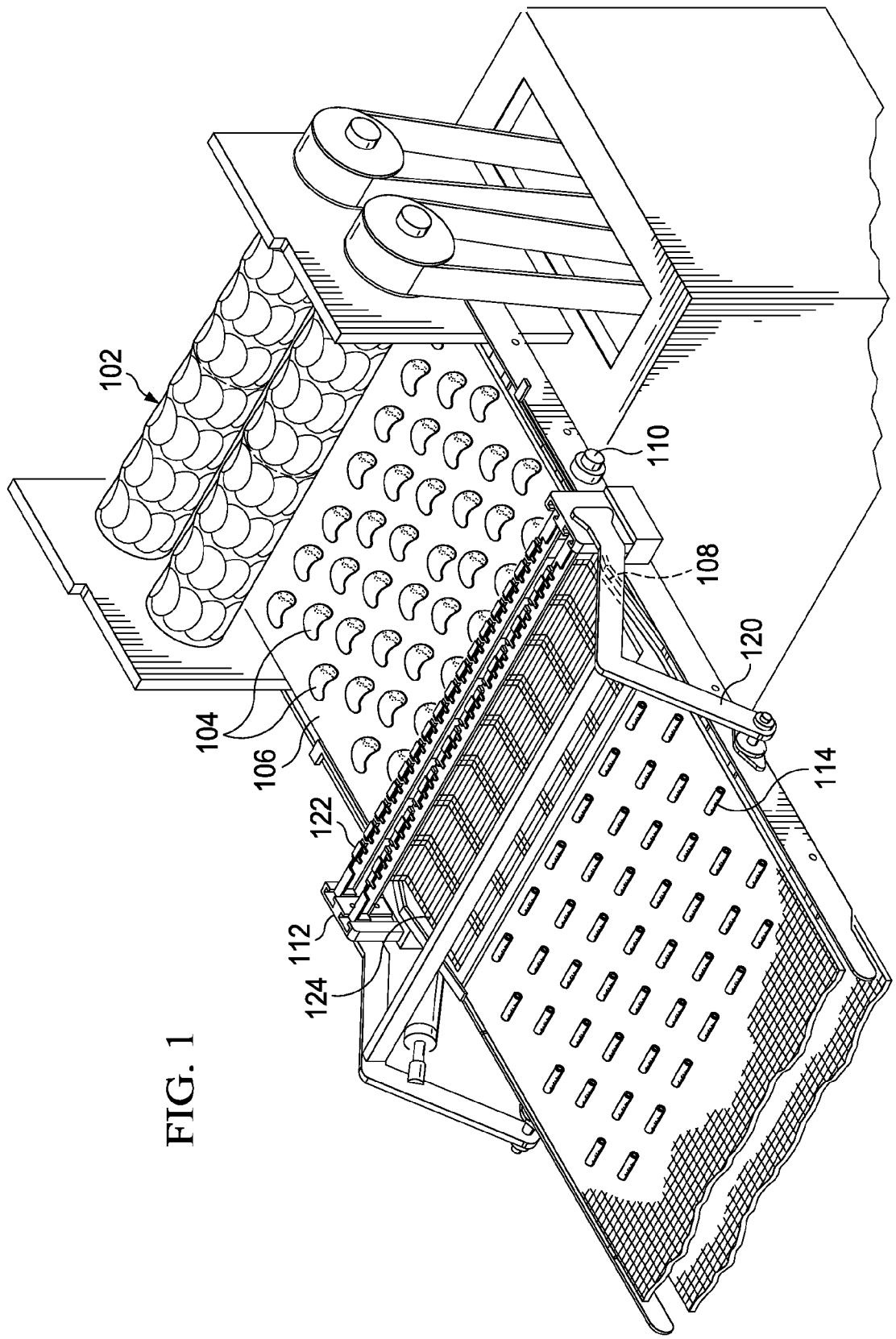
FIG. 1 is a perspective view of a dough-rolling apparatus in accordance with one embodiment of the present invention.
Figure 2:
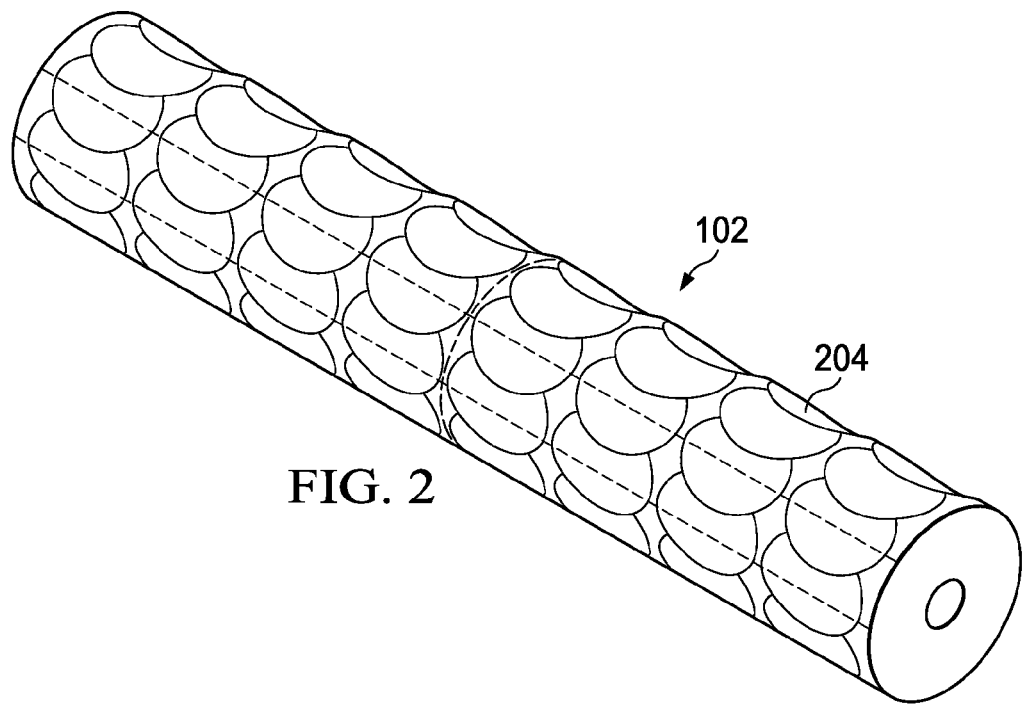
FIG. 2 is a perspective view of a dough sheeter/cutter used in one embodiment of the present invention.

FIG. 1 is a perspective view of a dough-rolling apparatus in accordance with one embodiment of the present invention, and FIG. 2 is a perspective view of the dough sheeter/cutter used in accordance with one embodiment of the present invention. The dough-rolling apparatus is capable of rolling most varieties of doughs, including but not limited to starch-, potato-, rice-, corn-, and wheat-based doughs, and combinations thereof. At the front end of the apparatus is a sheeter/cutter roller (sometimes referred to as a "sheeter") 102, which appears on the far right side of FIG. 1, and is shown in perspective view in FIG. 2. In a preferred embodiment, the sheeter 102 comprises an industrial combination sheeter-and-cutter such as, but not limited to, an eight-row corn masa sheeter. In another embodiment, a separate dough pre-form cutter can instead be positioned downstream from a sheeting roller. In a preferred embodiment, the system is designed to roll a flat pre-forms 104 into cylinders 114, which are approximately two inches long and ⅜ of an inch in diameter, as shown in FIG. 1. Note, however, that other embodiments and product sizes still fall within the scope of this invention.

Sheeted and cut pieces of dough ("pre-forms") 104 are transported away from the sheeting and cutting stage by a receiving conveyor 106. In a preferred embodiment, the conveyor is operated at a line speed higher than the rotational speed of the sheeter 102 in order to create space between the preforms 104. This receiving conveyor 106 may comprise any food-grade, durable, but flexible material able to withstand repeated abrasion by dough-rolling curtains 122, 124. The sheeting conveyor 106 preferably comprises a perforated or chain-link structure of a durable material such as stainless steel, carbon steel, or another type of metal, a ceramic, or an abrasion-resistant polymer-based substance. The conveyor 106 is supported and conducted by several rollers. This conveyor 106 has a ramped section 108, which is an inclined launch section immediately followed by a more gradually declining (or leveling) discharge section. The grade of the launch section and the declining/discharge section, and thus the steepness of the ramp peak, will vary depending on the line speed of the conveyor. At typical production rates, however, the launch angle is preferably about 20 to about 24 degrees from level, and the decline angle is preferably about 4 to about 8 degrees from level.

The conveyor 106 is set in motion using a conveyor drive assembly 110, which typically includes a motor (electric or gas) for the propelling force. A rolling unit 112 is positioned downstream from the sheeter 102 and above the conveyor 106. The rolling unit 112 preferably comprises several hanging mesh or chain curtains 122, 124 specifically selected for applying a desired amount of drag and weight onto the dough pre-forms 104. If desired, a lift-arm assembly 120 can also be included for quick removal and/or replacement of the rolling curtains 122, 124.

In operation, after dough is sheeted and cut into pre-forms 104, the pre-forms 104 are conveyed over the ramp of the ramped section 108, which then gradually levels or drops off to induce the leading edge of each pre-form 104 to lift off of the conveyor 106 as each pre-form 104 crests over the ramp. A roll-initiating curtain (or "first hanging curtain") 122 catches the leading edge of each pre-form 104 as it passes under the curtain 122, thereby causing each pre-form 104 to begin rolling back over itself. Thereafter, a roll-completing curtain (or "second hanging curtain") 124 completes the rolling of the dough pre-forms 104. In a preferred embodiment, the rolled product is a corn masa product and has: about 1.75 to about 2.25 wraps/rolls; a length of about 1.75 to about 2.25 inches; an outer diameter of about 0.32 to about 0.40 inches; and an inner diameter of about ¹⁄₁₆ths to about ³⁄₁₆ths of an inch. Most preferably, the rolled product after frying has: 2 wraps/rolls; a length of 1.9 inches; an outer diameter of 0.36 inch; and an inner diameter of about ⅛ths of an inch.

The shape of the preform used in accordance with the present invention has certain characteristics that allow it to be rolled into a cylinder that, when toasted, baked and/or fried, produces a snack product that is improved over prior art rolled snack food products. In one embodiment, the rolled preform of the present invention is cooked to a final moisture content of less than about 3% by weight, or in a preferred embodiment less than about 2% by weight, using one or a combination of the following unit cooking operations: baking, frying, impingement drying, microwaving, infrared heating, or toasting. In a preferred embodiment, the rolled preform is toasted to substantially fix the rolled shape before transferring the toasted preforms to subsequent cooking or drying operations, such as baking or frying.

As depicted in FIG. 1, the preform has a concave leading edge and a convex trailing edge. In the embodiment depicted in FIG. 1, the preform shape somewhat resembles a quarter moon or crescent moon.

FIG. 2 depicts a perspective view of the sheeter/cutter roller used in accordance with a preferred embodiment of the present invention. As depicted therein, each circumferential row of the roller is configured to produce a row of dough preforms with a convex side and a concave side. Moreover, the concave side of one preform is congruent with at least a portion of the convex side of the preform immediately adjacent to it in the same row. Arranging the cutting pattern in this manner allows practitioners of the present invention to minimize the generation of scrap, increase the productivity and production rate, and yet still produce preforms that yield improved rolled products, as described below.

When preforms are provided with a leading edge of concave shape and a trailing edge of convex shape, and the preform is rolled with the leading edge forming the interior of the rolled product and the trailing edge forming the exterior of the rolled product, the rolled preform can then be toasted, fried, baked or otherwise cooked to form a snack food product with improved qualities. One reason the rolled product of the present invention is improved over the prior art is because there is a more consistent amount of dough present throughout the length of the rolled product. When an oval or circular dough preform, which has a convex leading edge and convex trailing edge, is rolled, it produces a center portion with more layers of rolled dough, and thus a larger amount of dough, than portions of the rolled product closer to the ends of the rolled product. Such a rolled product will cook unevenly between the center and edges, causing difficulties in quality control, including moisture and texture control.

Another reason the rolled product of the present invention is advantageous is because it gives the rolled product the appearance of a traditional rolled product, such as a taco, but without the product consistency problems presented by a rolled oval or circular dough preform. Also, the appearance gives the rolled preform of the present invention an advantage over square, rectangular or other polygonal shaped preforms, which when rolled still have sharp corners and edges which are less desirable to consumers. The lack of sharp corners also helps the preforms of the present invention release well from the sheeter/cutter, thereby improving overall rolling performance and reducing product defects.

Finally, by arranging the sheeter/cutter in the manner shown in FIG. 2, with the concave edge of each preform being congruent and coterminous with at least a portion of the convex edge of the adjacent preform, practitioners of the present invention can see a capacity and throughput increase of at least 5% to 10% over prior art cutters that produce oval or circular preforms. The throughput increase is the result of reduced amount of scrap between preforms. The only scrap generated by the sheeter/cutter roller of the present invention is that found between each circumferential row of preform cutters 204. By contrast, a round or oval preform cutter would produce significant scrap between adjacent sides of each preform. Scrap can be minimized by cutting the dough sheet into triangles, squares, hexagons or other polygons with adjacent sides. However, such products will not have the desirable appearance of a rolled taco made from a round or oval tortilla.

The shape of the preform used in accordance with the present invention allows a practitioner to deliver a rolled snack food product with a desirable appearance (a round outer flap) and a consistent thickness throughout its length, all done with a preform that releases well from the cutter and produces less scrap than prior art processes that make rolled products with a round outer flap.

Figure 3:
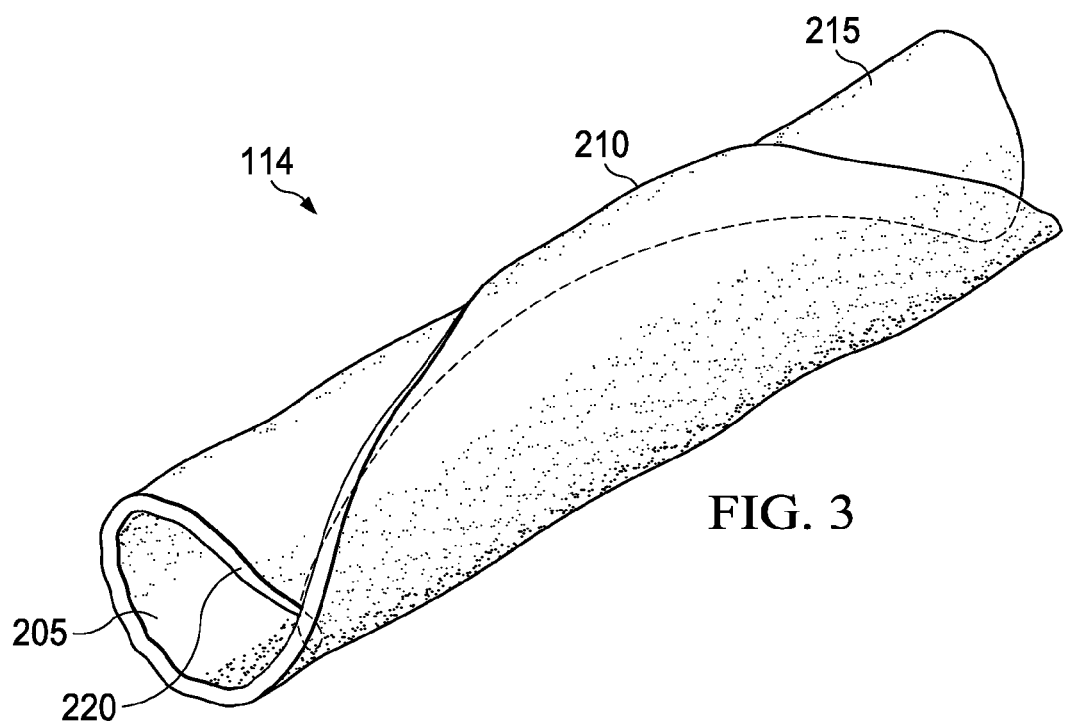
FIG. 3 is a perspective view of a snack food piece in accordance with one embodiment of the present invention.

FIG. 3 is a perspective view of one embodiment of the rolled snack food product 114 of the present invention. As depicted therein, the concave leading edge 220 has been rolled inside 205 the sack food product, while the convex trailing edge 210 has been rolled outside 215 the snack food product, forming a rounded outer flap.

While the invention has been particularly shown and described with reference to a preferred embodiment, it will be understood by those skilled in the art that various changes in form and detail may be made therein without departing from the spirit and scope of the invention.

We claim:

1. A rolled snack food comprising a concave leading edge rolled inside said snack food and a convex trailing edge forming a rounded flap outside said snack food.

2. The rolled snack food of claim 1 further comprising a total moisture content by weight of less than about 3%.

3. The rolled snack food of claim 1 further comprising a moisture content of less than about 2% by weight.

4. A method of making a rolled snack food product comprising:

cutting a dough sheet into dough preforms, wherein each said preform comprises a concave side and a convex side;

depositing said dough preforms onto a conveyor such that each said concave side is a leading edge and each said convex side is a trailing edge;

rolling said dough preforms to produce rolled dough preforms, wherein each said concave leading edge is inside each said rolled dough preform and wherein each said convex trailing edge is outside each said rolled dough preform, thereby forming a rounded outer flap on said preform;

cooking said preform to produce said rolled snack food product comprising less than 3% moisture by weight.

5. The method of claim 4 further comprising toasting said preforms after said rolling step and before said cooking step.

6. The method of claim 4 further comprising cooking said preform to produce the rolled snack food product comprising less than 2% moisture by weight.

\* \* \* \* \*